United States Patent
Burke et al.

(10) Patent No.: US 10,886,840 B2
(45) Date of Patent: Jan. 5, 2021

(54) MULTI-CHANNEL PULSE SEQUENCING TO CONTROL THE CHARGING AND DISCHARGING OF CAPACITORS INTO AN INDUCTIVE LOAD

(71) Applicant: Kainos Systems, LLC., Sparta, NJ (US)

(72) Inventors: James E. Burke, Sparta, NJ (US); Thomas Haran, III, Glenwood, NJ (US); Daniel Hoch, Randolph, NJ (US)

(73) Assignee: KAINOS SYSTEMS, LLC., Sparta, NJ (US)

( * ) Notice: Subject to any disclaimer, the term of this patent is extended or adjusted under 35 U.S.C. 154(b) by 0 days.

(21) Appl. No.: 16/662,687

(22) Filed: Oct. 24, 2019

(65) Prior Publication Data
US 2020/0366192 A1 Nov. 19, 2020

Related U.S. Application Data

(60) Provisional application No. 62/848,054, filed on May 15, 2019.

(51) Int. Cl.
*H02M 7/757* (2006.01)
*H02M 3/07* (2006.01)
*H02M 7/5387* (2007.01)
*H02M 1/08* (2006.01)

(52) U.S. Cl.
CPC .............. *H02M 3/07* (2013.01); *H02M 1/08* (2013.01); *H02M 7/53871* (2013.01); *H02M 7/757* (2013.01)

(58) Field of Classification Search
CPC . H02M 2001/0012; H02M 2001/0009; H02M 2001/385; H02M 2003/1566; H02M 2003/1557; H02M 1/32; H02M 1/081–084; H02M 3/156; H02M 3/158; H02M 3/1588; H02M 3/155; H02M 3/1582; H02M 3/157; H02M 3/1563; H02M 3/1584; H02M 7/66; H02M 7/68; H02M 7/70; H02M 7/72; H02M 7/75; H02M 7/753; H02M 7/757; H02M 7/7575; H02M 7/758; H02M 7/77; H02M 7/79; H02M 7/07; H02M 7/797; H02M 7/81; H04B 2215/069
USPC .................................. 323/271–272, 280–285
See application file for complete search history.

(56) References Cited

U.S. PATENT DOCUMENTS

| | | | |
|---|---|---|---|
| 4,866,349 A | 9/1989 | Weber et al. |
| 6,914,420 B2 | 7/2005 | Crocker |
| 6,998,999 B2 | 2/2006 | Fripp et al. |
| 8,004,813 B2 | 8/2011 | May |
| 8,369,980 B2 | 2/2013 | Buhler et al. |
| 8,629,572 B1 | 1/2014 | Phillips |
| 8,874,291 B2 | 10/2014 | Gresser |
| 9,533,591 B2 | 1/2017 | Ichikawa |

(Continued)

*Primary Examiner* — Bryan R Perez
(74) *Attorney, Agent, or Firm* — Dunlap Bennett & Ludwig, PLLC; Brendan E. Squire

(57) ABSTRACT

Apparatus and method for multi-channel pulse sequencing to control the charging and discharging of two capacitors into an inductive load. The invention allows devices that produce alternating magnetic fields (induction heating, AC motors, metal detectors, MRIs, wireless communication) to operate above 100% efficiency; thereby producing a power gain. The results of this improvement will allow these devices to be portable and low cost.

12 Claims, 3 Drawing Sheets

(56) References Cited

U.S. PATENT DOCUMENTS

| | | |
|---|---|---|
| 9,793,794 B2 | 10/2017 | Stauth et al. |
| 10,008,916 B2 | 6/2018 | Holcomb |
| 10,122,242 B2 | 11/2018 | Schneider |
| 10,177,605 B2 | 1/2019 | Shimokawa |
| 2011/0210617 A1 | 9/2011 | Randall |
| 2014/0072836 A1 | 3/2014 | Mills |
| 2017/0255218 A1* | 9/2017 | Gazit ........................ G05F 3/08 |
| 2019/0103768 A1 | 4/2019 | Uchida |

* cited by examiner

MULTI-CHANNEL PULSE SEQUENCING TO CONTROL THE CHARGING AND DISCHARGING OF CAPACITORS INTO AN INDUCTIVE LOAD

CROSS-REFERENCE TO RELATED APPLICATION

This application claims the benefit of priority of U.S. provisional application No. 62/848,054, filed May 15, 2019, the contents of which are herein incorporated by reference.

BACKGROUND OF THE INVENTION

The present invention relates to power controls and, more particularly, to power controls for inductive loads.

Existing power controls for inductive loads have limitations in efficiency in electronic devices and systems that generate alternating magnetic fields. The limitation is the output power efficiency linked to the input power.

Other devices and systems that produce alternating magnetic fields can provide a maximum of 97% efficiency or less. This efficiency limitation happens due to power loss from the input source to the output load. Another reason for the limitation is due to conservation of energy, where the energy output is equal to the input energy.

As can be seen, there is a need for an apparatus and method for providing a power control that improve efficiency when powering an inductive load.

SUMMARY OF THE INVENTION

In one aspect of the present invention, a multi-channel pulse sequencing power control is disclosed. The multi-channel pulse sequencing power control includes a pair of input terminals, including a positive input terminal and a negative input terminal configured to operatively connect to a direct current power supply. A pair of output terminals, including a positive output terminal and a negative output terminal are configured to operatively connect to an inductive load. A first capacitor and a second capacitor are coupled at a second end of the first capacitor and the second capacitor.

A first charging switch and a second charging switch each have a one connector attached to the positive input terminal and a control connector attached to one of a plurality of output terminals of a pulse width modulation (PWM) module. A second connector of the first charging switch is attached to a first end of the first capacitor and a second connector of the second charging switch is attached to a first end of the second capacitor. A control connector of the first bidirectional switch and a second bidirectional switch is attached to a separate one of the plurality of output terminals of the PWM. A second connector of each of the first bidirectional switch and the second bidirectional switch are coupled to the positive output terminal. A second connector of the first bidirectional switch is coupled to the first end of the first capacitor and the second connector of the second bidirectional switch is coupled to the first end of the second capacitor.

In some embodiments, the PWM is configured to alternately charge each of the first charging switch and the second charging switch. With the first charging switch charged, the PWM activates the first bidirectional switch so that first capacitor begins to oscillate with a connected inductive load. With the second charging switch charged, the PWM activates the second bidirectional switch so that the second capacitor begins to oscillate with the connected inductive load. With the second capacitor in a fully charged state, the oscillation of the first capacitor and the connected inductive load terminates.

In other aspects of the invention, a multi-channel pulse sequencing power control includes a pair of input terminals, including a positive input terminal and a negative input terminal configured to operatively connect to a direct current power supply. A pair of output terminals, including a positive output terminal and a negative output terminal are configured to operatively connect to an inductive load. A plurality of capacitors each have a first end and a second end, with each of the plurality of capacitors coupled at the second end. A charging switch is provided for each of the plurality of capacitors. The charging switch has first connector attached to the positive input terminal, a control connector attached to one of a plurality of outputs of a pulse width modulation (PWM) module, and a second connector of the charging switch attached to a first end of each of the plurality of capacitors. A bidirectional switch is also provided for each of the plurality of capacitors. A controlled connector of the bidirectional switch is attached to one of the plurality of outputs of the PWM. A first connector of the bidirectional switch is coupled to the positive output terminal. A second connector of the bidirectional switch is coupled to the first end of each of the plurality of capacitors.

The multi-channel pulse sequencing power control may also include where the PWM sequentially charges the charging switch associated with each of the plurality of capacitors. The PWM may also sequentially activate the bidirectional switch associated with each of the plurality of capacitors such that each of the plurality of capacitors oscillate with a connected inductive load. The multi-channel pulse sequencing power control may be configured where with a subsequent capacitor in a fully charged state, the oscillation of a preceding capacitor and the connected inductive load terminates. The PWM may sequentially cycle through each of the plurality of capacitors until the power source is deactivated.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provide an improved apparatus and method for multi-channel pulse sequencing to control the charging and discharging of capacitors into an inductive load.

The present invention breaks through that limitation by creating a circuitry process that allows stored energy from a couple of recently charged capacitors and a single inductor to oscillate current back and forth for a small portion of time. This momentary oscillation with the single inductor as a load will provide AC output magnetic fields with no momentary input signal. This will provide an average power gain.

By allowing one of two capacitors to sequentially charge while the other capacitor is discharging into the inductive load, such as a coil, a pulsed input power is provided while producing a continuous output power. Current devices require continuous input power to achieve a continuous output power.

The multi-channel pulse sequencing control allows alternating magnetic field producing electronic systems, such as induction heaters, AC motors, wireless coupling, and MRI systems, to operate with efficiencies above 100%. This is accomplished by momentary stored energy in the device or system to generate momentary alternating fields without any input energy.

Figure 1:
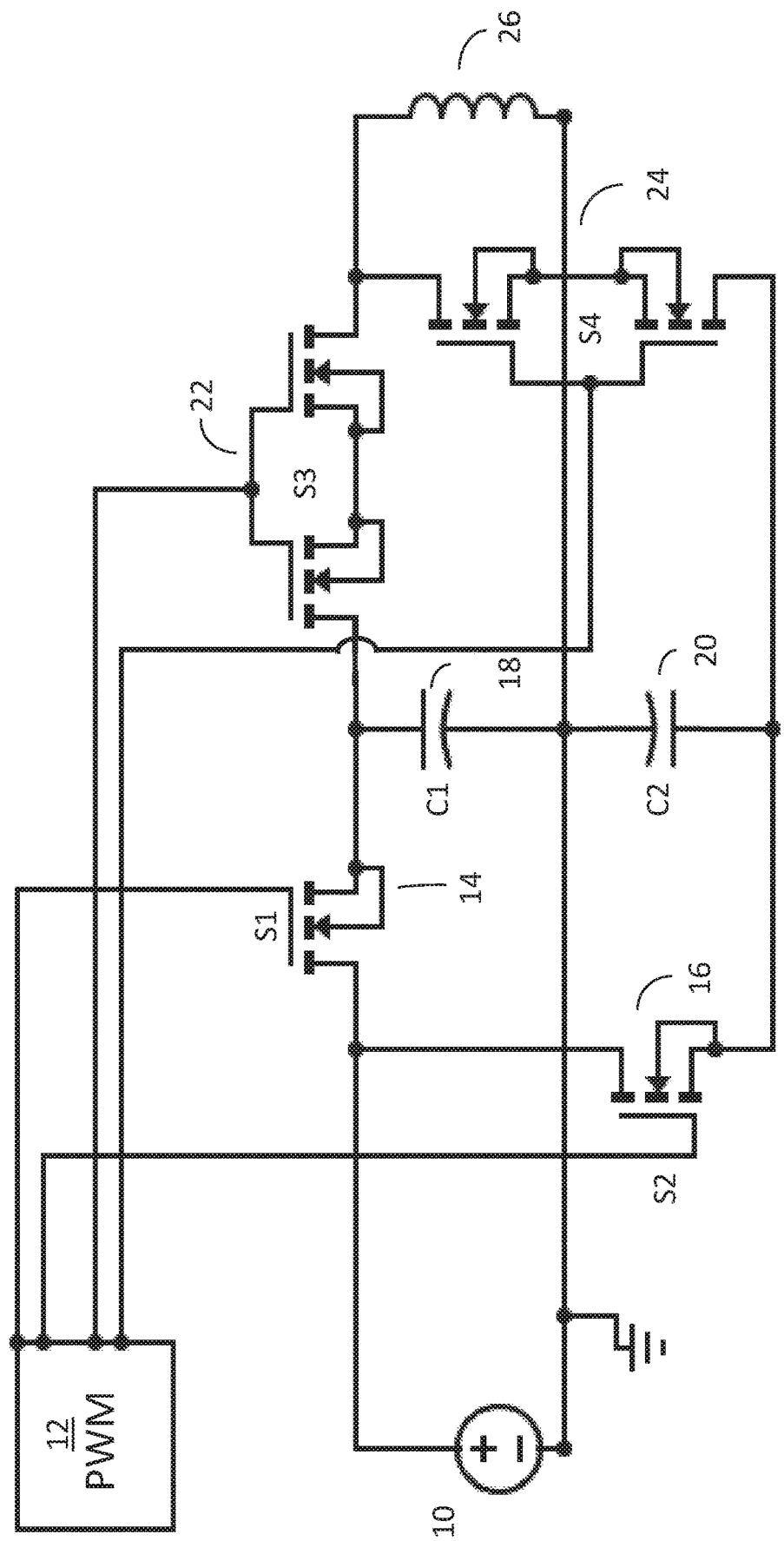
FIG. 1 is a schematic view of a multi-channel pulse sequencing control circuit.
Figure 2:
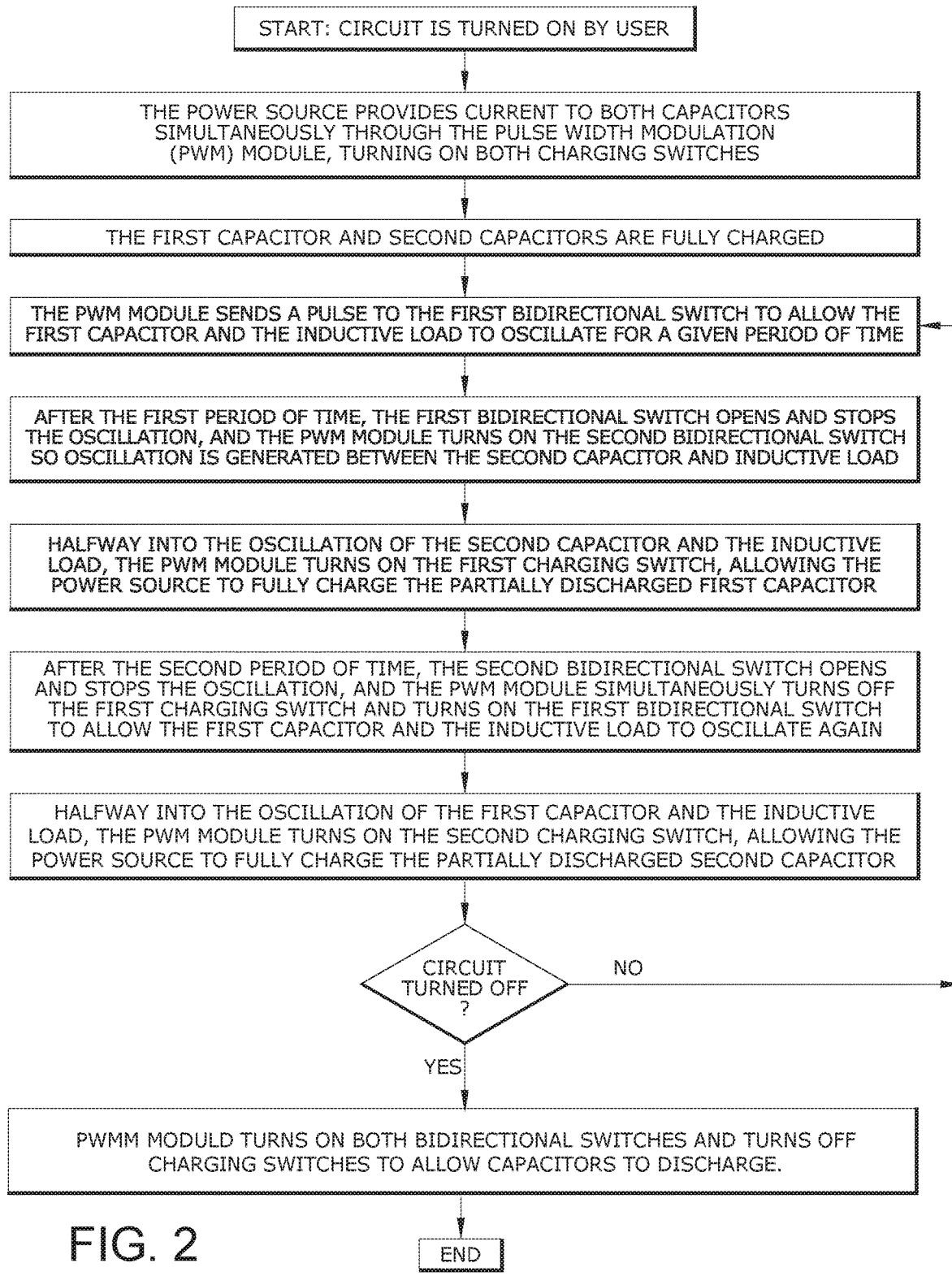
FIG. 2 is a flow chart of the invention.

As seen in reference to the drawings of FIG. 1, a power source 10 provides a DC power to input terminals of the device. The DC power supply 10 could be a battery, an AC to DC converter, AC to DC adaptor, as the type of DC power supply 10 can vary with the particular application. In other embodiments a power supply voltage indicator, or sensor circuit, could alert the user that the input voltage is low. A fuse may also be provided to protect the battery and the multi-channel pulse sequencing control of the present invention from a short circuit condition.

The DC power supply 10 charges capacitors C1 18 and C2 20 simultaneously through a pulse width modulation (PWM) module 12. The PWM module 12 activates a pair of charging switches on Sw1 14 and Sw2 16. Capacitors C1 18 and C2 20 are fully and partially charged, respectively.

The PWM module 12 is also configured to send a pulse to a first bidirectional switch Sw3 22 to allow the first capacitor C1 18 and an inductor 26 to oscillate for a predetermined period of time. In a two capacitor configuration, halfway into the oscillation between C1 18 and the inductor 26, the PWM module 12 activates the second charging switch Sw2 16 to allow the power source 10 to fully charge C2 20. After the second capacitor C2 20 is fully charged, the oscillation between the first capacitor C1 18 and the inductor 26 stops and the second capacitor C2 20 and the inductor 26 begin to oscillate through the PWM module 12 activation of a second bidirectional Sw4 24. Halfway into the oscillation between the second capacitor C2 20 and the inductor 26, the PWM module 12 activates the first charging switch Sw1 14 to allow the power source 10 to charge the first capacitor C1 18. In other embodiments, a plurality of capacitors and a corresponding charging switch may be sequentially activated by the PWM module 12.

Each charging switch and bidirectional may be implemented with number of digitally controlled switches, such as IGBT, BJT, MOSFETS, thyristors, and the like. Depending on the type switch, the respective input connections may variously be designated as a collector, a base, or an emitter. For ease of description, the switches described herein will have a first connector, a second connector, and a control connector, with the control connector indicating the terminal for activation or deactivation of the switch.

The multi-channel pulse sequencing control circuit function described above will continue to repeat until the circuit is turned off by the user or removal of the power supply 10 from the input terminals. During the times of oscillation between C1 18 and C2 20 and the inductor 26, the power source 10 is not providing any current.

The foregoing components may be assembled onto a flat platform and use electrical wiring or print circuit board traces to interconnect the components. The platform may then be installed inside an enclosure and a power supply and inductive coil 26, or load would be connected as described above.

Likewise, a potentiometer could be used to adjust the output power.

In the non-limiting embodiment shown in reference to FIG. 1, a first charging switch 14 and a second charging switch 16 each have a collector attached to the positive input terminal and a base connected to one of a plurality of output terminals of a pulse width modulation (PWM) module 12. An emitter of the first charging switch 14 is attached to a first end of the first capacitor 18 and an emitter of the second charging switch 16 is attached to a first end of the second capacitor 20. A base of each of a first bidirectional switch 22 and a second bidirectional switch 24 is attached to a separate one of the plurality of output terminals of the PWM 12 An emitter of each of the first bidirectional switch 22 and the second bidirectional switch 24 are coupled to the positive output terminal. A collector of the first bidirectional switch 22 is coupled to the first end of the first capacitor 18 and a collector of the second bidirectional switch 24 is coupled to the first end of the second capacitor 20.

Figure 3:
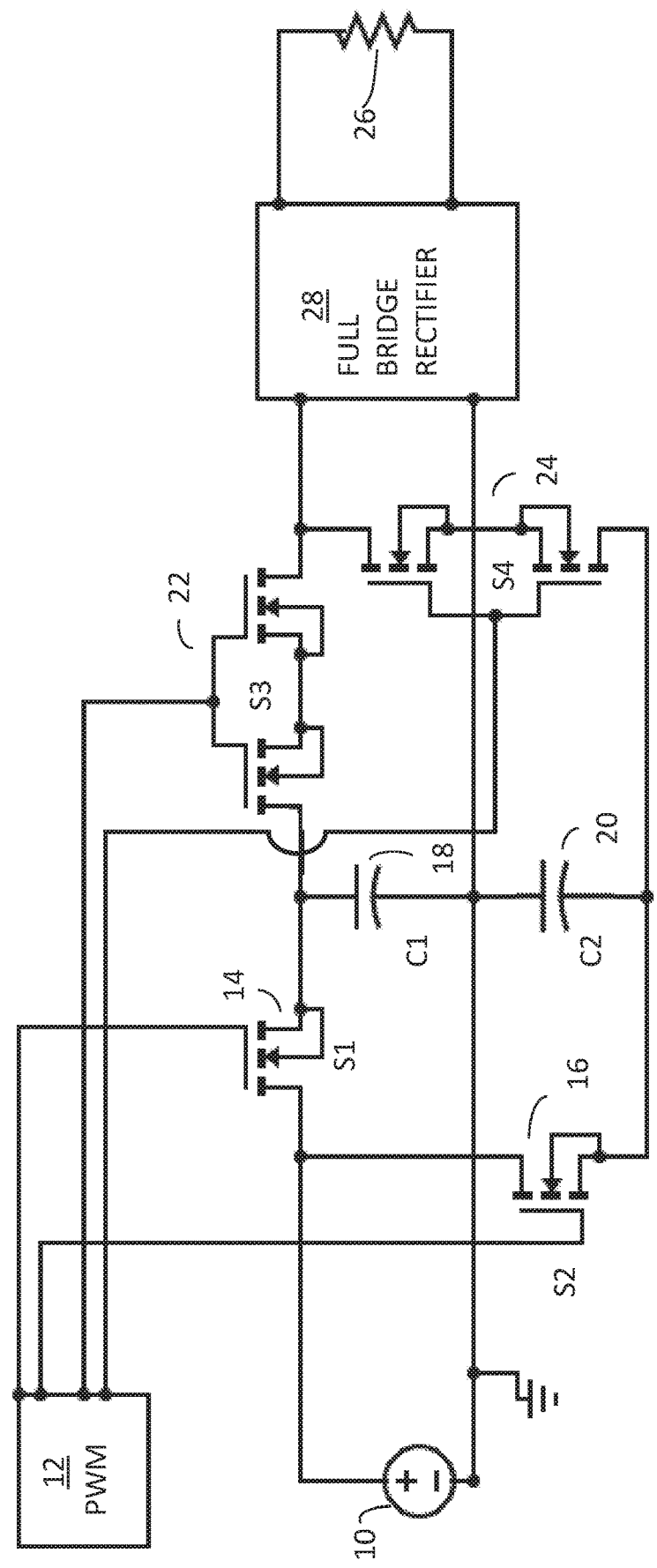
FIG. 3 is a schematic view of an alternate embodiment of the invention.

In an alternative embodiment, shown in reference to FIG. 3, a full-bridge inverter module 28 can be added to transmit alternating signals into a resistive load 30 instead of the inductive load 26. The full-bridge inverter module 28 connects across the outputs of the multi-channel pulse sequencing control.

To use this invention, one needs to connect a DC power supply 10 to the inputs of the multi-channel pulse sequencing control. Likewise, the inductive load 26 is operatively coupled to the output of the multi-channel pulse sequencing control. This present invention can be used induction heating and forging systems, AC motors, wireless communication, MRI, and metal detectors.

It should be understood, of course, that the foregoing relates to exemplary embodiments of the invention and that modifications may be made without departing from the spirit and scope of the invention as set forth in the following claims.

What is claimed is:

1. A multi-channel pulse sequencing power control, comprising:
    a pair of input terminals, including a positive input terminal and a negative input terminal configured to operatively connect to a direct current power supply;
    a pair of output terminals, including a positive output terminal and a negative output terminal;
    a first capacitor and a second capacitor coupled at a second end of the first capacitor and the second capacitor,
    a first charging switch and a second charging switch each having a first connection operatively connected to the positive input terminal, and a control connector operatively connected to an output of a pulse width modulation (PWM) module;
    a second connector of the first charging switch attached to a first end of the first capacitor and a second connector of the second charging switch attached to a first end of the second capacitor; and
    a control connector of each of a first bidirectional switch and a second bidirectional switch are operatively attached to the PWM, an second connector of each of the first bidirectional switch and the second bidirectional switch are operatively coupled to one of the pair of output terminals, a first connector of the first bidirectional switch is coupled to the first end of the first capacitor, and a first connector of the second bidirectional switch is operatively coupled to the first end of the second capacitor.

2. The multi-channel pulse sequencing power control of claim 1, wherein the PWM alternately charges each of the first charging switch and the second charging switch.

3. The multi-channel pulse sequencing power control of claim 2, wherein with the first charging switch charged, the PWM activates the first bidirectional switch so that first capacitor begins to oscillate with a connected inductive load.

4. The multi-channel pulse sequencing power control of claim 3, wherein with the second charging switch charged, the PWM activates the second bidirectional switch so that the second capacitor begins to oscillate with the connected inductive load.

5. The multi-channel pulse sequencing power control of claim 3, wherein with the second capacitor in a fully charged state, the oscillation of the first capacitor and the connected inductive load terminates.

6. The multi-channel pulse sequencing power control of claim 5, further comprising:
   a full-bridge inverter MOSFET connected across the output terminals.

7. A multi-channel pulse sequencing power control, comprising:
   a pair of input terminals, including a positive input terminal and a negative input terminal configured to operatively connect to a direct current power supply;
   a pair of output terminals, including a positive output terminal and a negative output terminal;
   a plurality of capacitors each having a first end and a second end, with each of the plurality of capacitors coupled at the second end;
   a charging switch for each of the plurality of capacitors, the charging switch having a first connector connected to the positive input terminal, a control connector operatively connected to an output of a pulse width modulation (PWM) module, and a second connector of the charging switch attached to a first end of for each of the plurality of capacitors; and
   a bidirectional switch for each of the plurality of capacitors, a control connector of the bidirectional switch attached to an output of the PWM, a second connector of the bidirectional switch coupled to the positive output terminal, and a first connector of the bidirectional switch coupled to the first end of each of the plurality of capacitors.

8. The multi-channel pulse sequencing power control of claim 7, wherein the PWM sequentially charges the charging switch associated with each of the plurality of capacitors.

9. The multi-channel pulse sequencing power control of claim 8, wherein the PWM sequentially activates the bidirectional switch associated with each of the plurality of capacitors such that each of the plurality of capacitors oscillate with a connected inductive load.

10. The multi-channel pulse sequencing power control of claim 9, wherein with a subsequent capacitor in a fully charged state, the oscillation of a preceding capacitor and the connected inductive load terminates.

11. The multi-channel pulse sequencing power control of claim 10, wherein the PWM sequentially cycles through each of the plurality of capacitors until the power source is deactivated.

12. The multi-channel pulse sequencing power control of claim 10, further comprising:
   a full-bridge inverter MOSFET circuit operatively connected to the output terminals.

* * * * *